United States Patent

Konno et al.

Patent Number: 5,596,443
Date of Patent: Jan. 21, 1997

[54] POLYGON MIRROR ROTOR AND POLYGON MIRROR SCANNER MOTOR HAVING SUCH ROTOR

[75] Inventors: Daisuke Konno, Kanagawa-ken; Hideo Furukawa, Tokyo; Isami Nitta, Niigata-ken; Kimio Komata, Urawa, all of Japan

[73] Assignee: Ebara Corporation, Tokyo, Japan

[21] Appl. No.: 428,681

[22] Filed: Apr. 25, 1995

[30] Foreign Application Priority Data

Apr. 27, 1994 [JP] Japan ................................. 6-112011

[51] Int. Cl.$^6$ ................................................ G02B 26/08
[52] U.S. Cl. ........................... 359/200; 359/198; 359/216; 359/217; 359/855
[58] Field of Search ................................ 359/198, 200, 359/855, 871, 872, 216–217; 310/90, 90.5; 384/107, 111–115, 120, 123

[56] References Cited

U.S. PATENT DOCUMENTS 4,984,881  1/1991  Osada et al. .......................... 359/198
5,373,391  12/1994  Isobe et al. ........................... 359/198

FOREIGN PATENT DOCUMENTS 64-72975  3/1989  Japan.
6-67110  3/1994  Japan.

*Primary Examiner*—James Phan
*Attorney, Agent, or Firm*— Wenderoth, Lind & Ponack

[57] ABSTRACT

A polygon mirror rotor includes a ceramic ring of a generally hollow cylindrical shape having a cylindrical inner surface serving as a sliding surface of a radial hydrodynamic bearing and a pair of end surfaces each serving as a sliding surface of a thrust hydrodynamic bearing. A plastic ring is fixedly fitted over the ceramic ring, and a polygon mirror made of aluminum is fixedly fitted over the plastic ring by shrinkage fit. The plastic ring has a thermal expansion coefficient greater than that of the ceramic ring as well as greater than that of the aluminum polygon mirror, thereby providing a polygon mirror rotor which does not adversely affect the jitter characteristic of a motor incorporating the rotor.

10 Claims, 4 Drawing Sheets

5,596,443

POLYGON MIRROR ROTOR AND POLYGON MIRROR SCANNER MOTOR HAVING SUCH ROTOR

BACKGROUND OF THE INVENTION

1. Field of the Art

The present invention relates to a polygon mirror rotor including a polygon mirror, and a polygon mirror scanner motor having such a rotor.

2. Prior Art

A polygon mirror rotor and a polygon mirror scanner motor are widely used in a variety of fields.

FIG. 7 is a cross sectional view showing an arrangement of a conventional polygon mirror rotor of this type. In FIG. 7, reference numeral 1 denotes a ceramic ring of a generally hollow cylindrical shape. The polygon mirror rotor further includes a polygon mirror 3 and upper and lower yokes 4 and 5. When assembling the rotor, the upper yoke 4 is fitted over the ceramic ring 1 by shrink fitting. Then, the bottom surface of the upper yoke 4 and the top surface of the lower yoke 5, which are to be in contact with the upper and lower surfaces of the polygon mirror 3 are finished to flat and smooth surfaces with a high degree of flatness and no surface roughness. Then, the polygon mirror 3 is fitted over the ceramic ring 1 and is sandwiched between the upper and lower yokes 4 and 5, and, then the yokes 4 and 5 are fastened to each other by means of several screws 11 to secure the polygon mirror 3 between them. A rotor magnet 6 forming a part of a driving motor is attached on the bottom surface of the lower yoke 5. The polygon mirror 3 is of a polygonal shape as viewed in plan and has a plurality of mirror surfaces 9 formed therearound.

FIG. 8 is a cross sectional view showing an arrangement of a conventional polygon mirror scanner motor including the above described polygon mirror rotor. As shown, the polygon mirror scanner motor includes a base 17, a shaft 15 fixed on the base 17, a radial shaft sleeve 14 fitted over and fixed to the shaft 15, and a thrust plate 12 fixed to the lower end surface of the shaft sleeve 14. The ceramic ring 1 fitted over the radial shaft sleeve 14 has a cylindrical inner surface in sliding contact with the cylindrical outer surface of the radial shaft sleeve 14, and a lower end surface in sliding contact with the top surface of the thrust plate 12. Another thrust plate 13, which is fixed to the bottom surface of a support plate 19, is fixed to the upper end of the radial shaft sleeve 14. In this arrangement, a radial hydrodynamic bearing is formed between the cylindrical outer surface of the radial shaft sleeve 14 and the cylindrical inner surface of the ceramic ring 1. Further, a pair of thrust hydrodynamic bearings are formed, one between the top surface of the thrust plate 12 and the lower end surface of the ceramic ring 1, and the other between the bottom surface of the thrust plate 13 and the upper end surface of the ceramic ring 1.

The support plate 19 is fixed to the upper end of the shaft 15 by means of a screw 16. A counter magnet 20 is attached to the bottom surface of the support plate 19 at a predetermined position. This counter magnet 20 produces a predetermined magnetic attracting force on the upper yoke 4 made of a ferromagnetic material so as to attract and lift the polygon mirror rotor. There is a stator coil 18 fixed on the base 17. By supplying a current to the stator coil 18, the polygon mirror rotor, and thus the polygon mirror 3, is driven to rotate at high speed.

The above described conventional polygon mirror rotor, however involves the following problems:

(1) When the polygon mirror rotor is driven to rotate at high speed, centrifugal force acts on the polygon mirror 3, and heat produced by rotation raises the temperature of the polygon mirror 3, resulting in a radial expansion or deformation of the polygon mirror 3. However, since several through holes for receiving fastening screws 11 are formed in the polygon mirror 3, the deformation in the polygon mirror is not uniform but differs from area to area depending on whether they are near or far from the through holes, which adversely affects the jitter characteristic of the motor.

(2) The polygon mirror 3 is secured between the upper and lower yokes 4 and 5 by fastening the yokes to each other by means of several screws 11. Thus, the polygon mirror 3 is held in position by the yokes 4 and 5 solely through the frictional force acting between the top surface of the polygon mirror 3 and the lower surface of the upper yoke 4 and between the bottom surface of the polygon mirror 3 and the upper surface of the lower yoke 5. On the other hand, the polygon mirror 3, which is made of aluminum, and the yokes 4 and 5, which may be preferably made of steel, typically have thermal expansion coefficients which are considerably different from each other. Therefore, when a certain temperature change is caused in the polygon mirror rotor by, for example, high speed rotation of the rotor and/or environmental temperature change during operation or storage of the rotor, some slippage may occur between the surfaces in frictional contact with each other (i.e., between the surfaces of the polygon mirror 3 and the associated surfaces of the upper and lower yokes 4 and 5). Any such slippage causes stress in the polygon mirror 3 which tends to adversely affect accuracy in the positioning of the mirror surfaces 9 of the polygon mirror 3 and causes a progressive deterioration in the jitter characteristic of the motor and which further disturbs the balance of the rotor, resulting in an increase in vibration of the rotor.

(3) A change in frictional force acting between the polygon mirror 3 and the yokes 4 and 5 produces stress in the polygon mirror 3, which affects the mirror surfaces 9 of the polygon mirror 3 and may produce some deformation in the mirror surfaces 9. Therefore, all of the surfaces involved in the frictional contacts, i.e., the top and bottom surfaces of the polygon mirror 3 and the associated surfaces of the upper and lower yokes 4 and 5, each having a considerably large area, must be finished into flat and smooth surfaces with a high degree of accuracy. Further, these parts must be carefully assembled to prevent any undesirable stress being induced in the polygon mirror 3. This makes assembly of the polygon mirror rotor very cumbersome and costly.

(4) When the mirror surfaces of the polygon mirror are finished, an oil is used as a lubricating agent.

In the conventional polygon mirror rotor, however, the upper and lower yokes 4 and 5 and the polygon mirror 3 include through holes or threaded holes for receiving the fastening screws 11 therein and the polygon mirror 3 is secured between the upper and lower yokes 4 and 5 by means of several screws 11. Accordingly, the configuration and construction of the polygon mirror rotor are relatively complicated and it is actually impossible to use the oil after assembly of the polygon mirror rotor is completed, since the oil cannot easily be removed from the completed rotor.

Therefore, in the conventional polygon mirror rotor, the mirror surfaces of the polygon mirror must be finished before assembly and, then, the polygon mirror must be assembled in the rotor after completely removing the oil from the polygon mirror.

As a result, a reference plane used for finishing the mirror surfaces of the polygon mirror is different from a reference plane for the assembly or rotation of the polygon mirror rotor.

Therefore, it is very difficult to obtain an ideal or extremely precise center of rotation for all of the mirror surfaces of the polygon mirror and care must be taken during assembling the polygon mirror in the rotor, which makes the production of the polygon mirror rotor very cumbersome and costly.

In view of the foregoing, it is an object of the present invention to provide a polygon mirror rotor which is free from the above shortcomings, does not adversely affect the jitter characteristic of the motor, prevents any progressive deterioration of balance, is easy to manufacture and has superior stability, and a polygon mirror scanner motor including such a polygon mirror rotor.

SUMMARY OF THE INVENTION

In order to solve the above mentioned problems, the present invention provides a polygon mirror rotor, which comprises: a ceramic ring of a generally hollow cylindrical shape having a cylindrical inner surface serving as a sliding surface of a radial hydrodynamic bearing and a pair of end surfaces each serving as a sliding surface of a thrust hydrodynamic bearing; a plastic ring fixedly fitted over the ceramic ring; and a polygon mirror made of aluminum and fixedly fitted over the plastic ring by shrinkage fit; wherein the plastic ring has a thermal expansion coefficient greater than that of the ceramic ring as well as greater than that of the polygon mirror.

The plastic ring may include a plurality of voids of the same shape formed therein, the number of the voids being equal to the number of the mirror surfaces of the polygon mirror, the voids being arranged at uniform intervals in a circular array concentric with the plastic ring. The voids may be through holes or recesses.

The polygon mirror rotor may further comprises an upper yoke fixedly fitted over the ceramic ring above the plastic ring and the polygon mirror, and a lower yoke supporting a magnet ring and fixedly fitted over the ceramic ring below the plastic ring and the polygon mirror, wherein the upper and lower yokes are mounted on the ceramic ring without any contact with the plastic ring and the polygon mirror.

The upper yoke may be made of ferromagnetic material so that the rotor may be attracted and lifted by a counter magnet.

The mirror surfaces of the polygon mirror may be finally finished after the plastic ring, the polygon mirror, the upper yoke and the lower yoke are mounted on the ceramic ring so that highly precise and flat mirror surfaces may be obtained.

By virtue of the arrangement of the present invention as described above, when the polygon mirror is expanded by an increase in temperature of the polygon mirror and/or by centrifugal force during the high speed rotation of the rotor, the plastic ring will expand correspondingly so as to suppress change in the retaining force of the tight-fit between the polygon mirror and the plastic ring and prevent any nonuniform deformation in the mirror surfaces of the polygon mirror. At the same time, the plastic ring expands inwardly so as to maintain the fitting and bonding between the plastic ring and the ceramic ring.

Thus, the jitter characteristic of the motor will not be adversely affected by expansion of the polygon mirror.

Further, when the yokes are not directly in contact with the polygon mirror, although the upper and lower yokes are deformed by the change in temperature and/or by the centrifugal force during the high speed rotation of the rotor, such deformations of the yokes do not cause any undesirable deformation in the mirror surfaces (which deformation otherwise could result in a deterioration in the jitter characteristic). Moreover, although the deformations of the upper and lower yokes caused by the change in temperature and/or by the centrifugal force may affect the ceramic ring so as to cause some deformation therein, any such deformation may be absorbed by the plastic ring and does not adversely affect the mirror surfaces, which otherwise could result in a deterioration in the jitter characteristic.

In addition, the plastic ring may include a plurality of voids formed therein, which may be through holes or recesses. The number of the voids is equal to the number of the mirror surfaces of the polygon mirror. The voids are arranged at uniform intervals in a circular array concentric with the plastic ring.

These voids serve to suppress the deformation of the mirror surfaces while maintaining a tight-fit between the plastic ring and the polygon mirror and the fitting and bonding between the plastic ring and the ceramic ring.

More specifically, as stated above, when the polygon mirror is expanded by the increase in temperature of the polygon mirror and/or by the centrifugal force produced during the high speed rotation of the rotor, the plastic ring will expand outwardly so as to maintain the tight-fit between the plastic ring and the polygon mirror and, at the same time, expands inwardly so as to maintain the tight-fit and bonding between the plastic ring and the ceramic ring.

The inward expansion of the plastic ring, however, tends to cause circumferential stress in the plastic ring and the ceramic ring bonded thereto and such circumferential stress may be transmitted to the polygon mirror causing uneven deformation in the mirror surfaces.

The provision of the voids in the plastic ring may advantageously absorb such circumferential stress and avoid uneven deformation in the mirror surfaces, which otherwise would be caused in the polygon mirror surfaces.

Finally, the configuration and the construction of the polygon mirror rotor of the present invention are relatively simple, because no through holes or threaded holes are provided in the polygon mirror and the upper and the lower yokes and no screws or bolts are used to fix the polygon mirror in the rotor.

Therefore, polygon mirror surfaces may be finished by using an oil even after assembly of the polygon mirror in the rotor since such oil may be easily removed from the rotor through high speed rotation.

Accordingly, the reference plane used for finishing the mirror surfaces may be made identical with that of the rotation and it is easy to obtain an ideal center of rotation for every mirror surface of the polygon mirror, and production of the polygon mirror can be made relatively easily and cheaply.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

The embodiments of the present invention will be described below in conjunction with the accompanying drawings.

Figure 1:
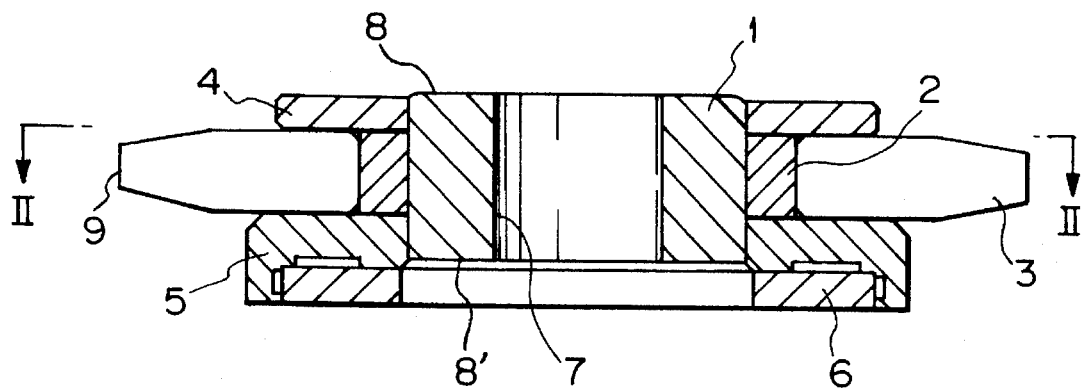
FIG. 1 is a front cross sectional view showing an arrangement of a polygon mirror rotor in accordance with one embodiment of the present invention.
Figure 2:
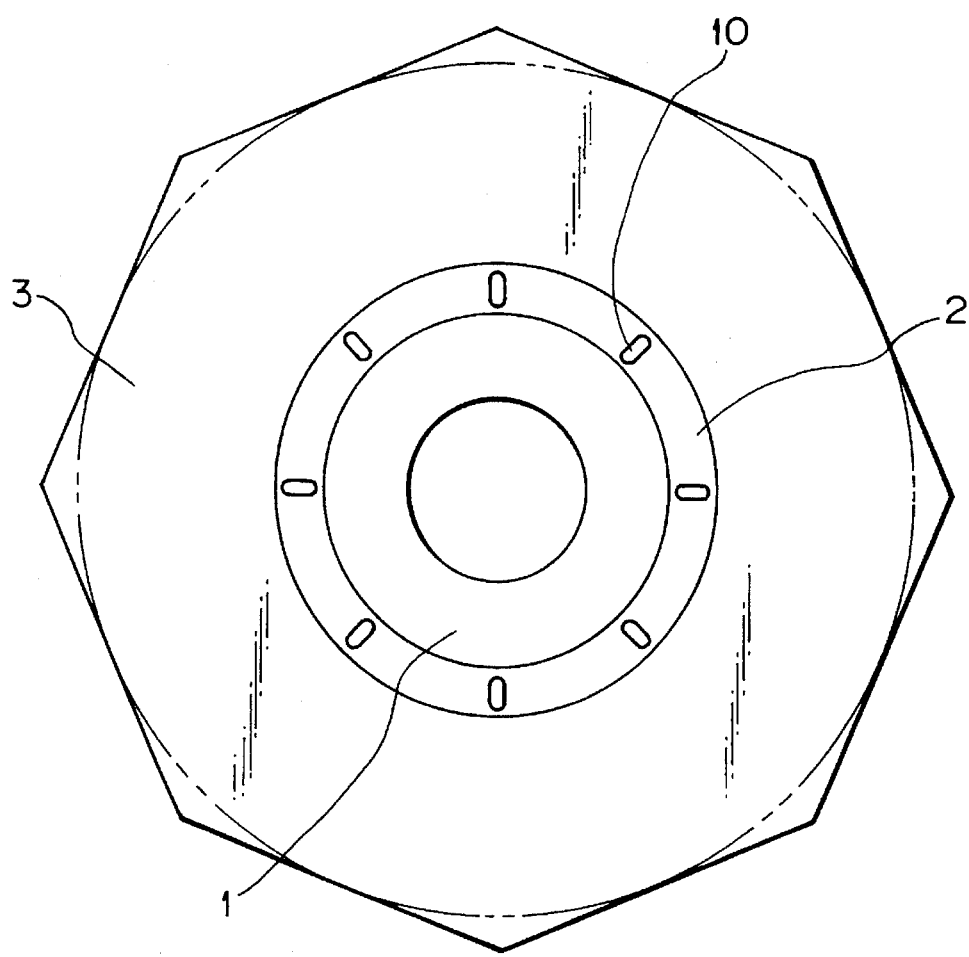
FIG. 2 is a sectional view taken along line II—II in FIG. 1 and showing a view of a plastic ring and an aluminum polygon mirror in accordance with the present invention.

FIG. 1 is a front cross sectional view showing a polygon mirror rotor according to an embodiment of the present invention. FIG. 2 shows a plastic ring 2 as viewed in plan. In FIG. 1, reference numeral 1 denotes a ceramic ring of a generally hollow cylindrical shape, which is made of a suitable ceramic material and has a cylindrical inner surface serving as a sliding surface of a radial hydrodynamic bearing. Plastic ring 2 is made of suitable plastic material and is fitted over and bonded to the ceramic ring 1. The plastic ring 2 has a thermal expansion coefficient so selected as to be greater than that of the ceramic ring 1 as greater well as than that of a polygon mirror 3 made of aluminum. Thus, stress caused by shrinkage fit of the aluminum polygon mirror 3 over the plastic ring 2, as well as any changes in the stress due to centrifugal force and/or temperature change, may be absorbed by the plastic ring 2, thereby preventing any nonuniform deformation in the mirror surfaces 9 of the polygon mirror 3, which otherwise could cause changes in jitter characteristic.

As shown in FIG. 2, the plastic ring 2 has a plurality of through holes 10 formed therein, which are arranged at uniform intervals in a circular array concentric with the plastic ring 2. Each hole 10 has an elliptical shape in cross section. The holes 10 serve to absorb the circumferential stress caused in the plastic ring 2 by temperature change and/or centrifugal force. By virtue of the provision of the holes 10, the plastic ring 2 can suppress nonuniform deformation of the polygon mirror 3 to a further extent, which otherwise could adversely affect the mirror surfaces 9 of the polygon mirror 3.

Figure 3:
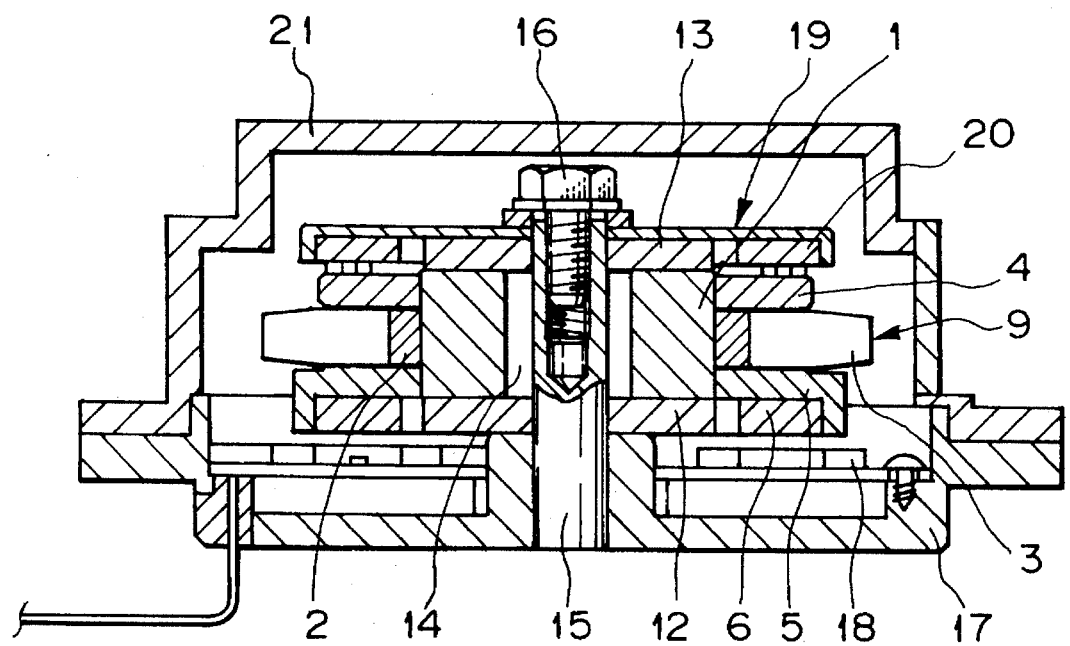
FIG. 3 is a cross sectional view showing an arrangement of a polygon mirror scanner motor according to one embodiment of the present invention.
Figure 8:
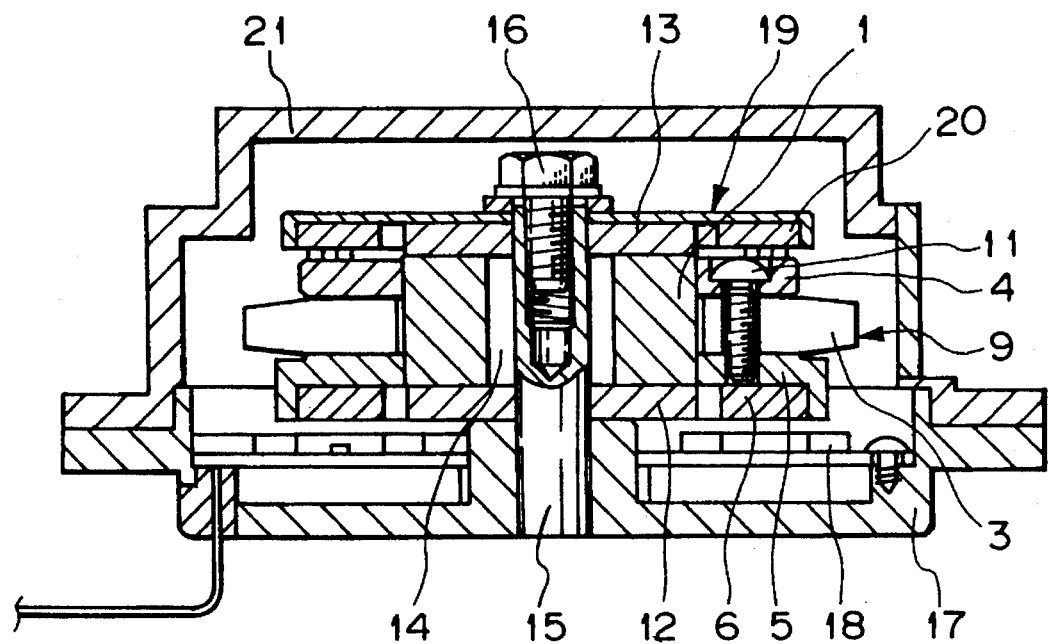
FIG. 8 is a cross sectional view showing an arrangement of a conventional polygon mirror scanner motor.

The polygon mirror rotor shown in FIG. 1 may be incorporated in a polygon mirror scanner motor such as shown in FIG. 3 like in the conventional polygon mirror rotor shown in FIG. 8. In this case, the upper yoke 4 may be preferably made of a ferromagnetic material, so that the polygon mirror scanner motor may have an arrangement in which a counter magnet 20 serves to attract and lift the polygon mirror rotor, thereby reducing the initial frictional torque of the thrust hydrodynamic bearings at the start of the rotation of the rotor.

Figure 4A:
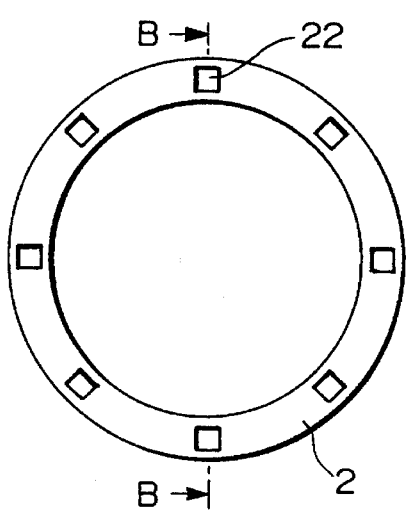
FIGS. 4(a) and 4(b) show another embodiment of through holes formed in the plastic ring.
Figure 4B:

FIGS. 4(a) and 4(b) show another embodiment of through holes formed in the plastic ring 2, in which FIG. 4(a) is a plan view and FIG. 4(b) is a cross sectional view taken along line B—B in FIG. 4(a). In this embodiment, each through hole 22 has a square shape in cross section instead of the elliptical shape of the through hole shown in FIG. 2. Any shape of through holes formed in the plastic ring 2 at uniform intervals in a circular array concentric with the plastic ring 2 may provide similar effects irrespective of their shapes in cross section, including, for example, circular, elliptical, rectangular and arcuate shapes.

Figure 5A:
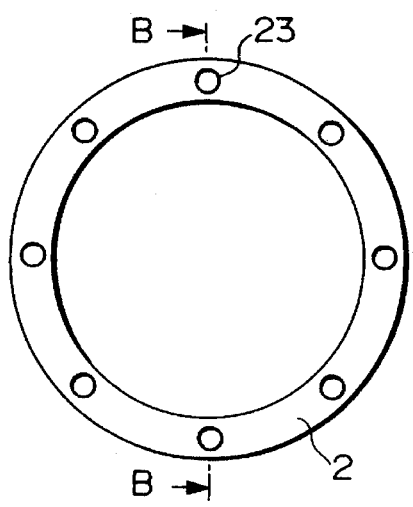
FIGS. 5(a) and 5(b) show an embodiment of recesses formed in the plastic ring.
Figure 5B:

FIGS. 5(a) and 5(b) show an embodiment of recesses formed in the plastic ring 2, in which FIG. 5(a) is a plan view and FIG. 5(b) is a cross sectional view taken along line B—B in FIG. 5(a). In this embodiment, the plastic ring 2 has recesses 23 formed in the upper and lower surfaces, instead of the through holes. Each recess 23 has a circular shape in cross section and a predetermined depth. The recesses 23 may provide similar effects as those of the through holes shown in FIGS. 2, 4(a) and 4(b). When neither the environmental conditions of the rotor nor the requirements for jitter characteristics are very strict, the plastic ring 2 may have recesses not completely penetrating through the plastic ring 2, as shown in FIGS. 5(a) and 5(b).

Figure 6A:
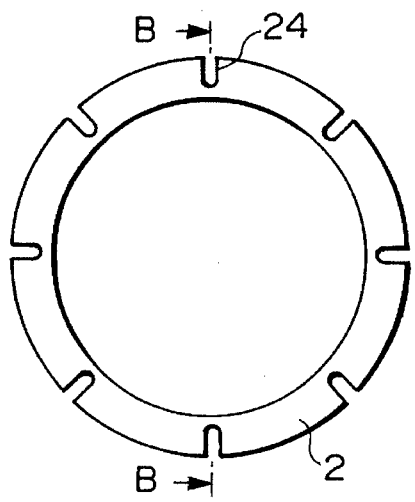
FIGS. 6(a) and 6(b) show another embodiment of recesses formed in the plastic ring.
Figure 6B:
Figure 7:
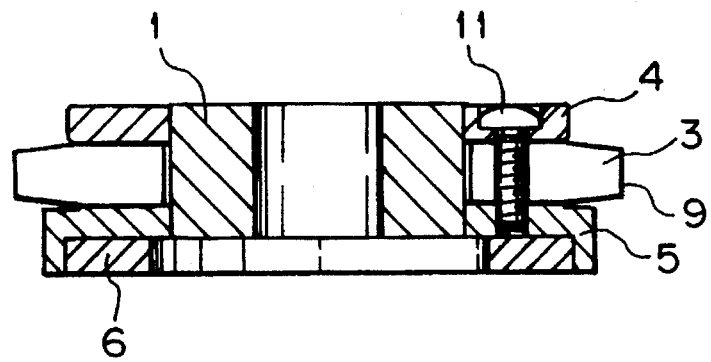
FIG. 7 is a cross sectional view showing an arrangement of a conventional polygon mirror rotor.

FIGS. 6(a) and 6(b) show another embodiment of recesses formed in the plastic ring 2, in which FIG. 6(a) is a plan view and FIG. 6(b) is a cross sectional view taken along line B—B in FIG. 6(a). In this embodiment, the plastic ring 2 has recesses 24 which are formed as notches recessed from the periphery of the plastic ring 2 by a predetermined depth. The recesses 24 may provide similar effects as those of the through holes shown in FIGS. 2, 4(a) and 4(b).

As clearly understood from the foregoing description, the present invention provides the following advantages:

(1) The plastic ring absorbs the deformation of the aluminum polygon mirror induced by temperature change and/or centrifugal force during high speed rotation, so that the deformation of the mirror surfaces of the polygon mirror may be reduced even when such centrifugal force or environmental temperature changes are relatively large. Further, by virtue of the provision of the plurality of voids, which may be through holes or recesses, formed in the plastic ring and arranged at uniform intervals in a circular array concentric with the plastic ring, the circumferential stress caused in the plastic ring and the ceramic ring by the expansion is effectively absorbed and, therefore, the mirror surfaces of the polygon mirror will deform uniformly, so that the jitter characteristic of the motor is not adversely affected.

(2) The polygon mirror and the upper and lower yokes need not have a plurality of through holes formed therein for receiving fastening screws therein, resulting in a reduction in machining and assembling time, so that production costs may be reduced.

(3) The mirror surfaces of the polygon mirror may be finished at the final stage of assembly of the polygon mirror rotor, thereby facilitating an automated production, enabling a simplification of production steps, and a reduction in production costs.

(4) Since the finishing of the mirror surfaces may be done at the final stage of the assembly of the polygon mirror rotor, the reference plane used for finishing the mirror surfaces of the polygon mirror and the reference plane of rotation during operation can be made the same, so that an ideal center of rotation can easily be obtained for every mirror surface, and a replacement of parts of the rotor by a new ones, if necessary, is facilitated.

(5) The upper and lower yokes are mounted without any contact with the polygon mirror, so that it is not necessary to finish the surfaces of the yokes and upper and lower surfaces of the mirror with high accuracy. In addition, it is not necessary to provide the yokes with structures for fastening the polygon mirror thereto by means of screws, so that the yokes may be formed in simple annular forms, thereby facilitating a substantial reduction in production costs.

What is claimed is:

1. A polygon mirror rotor, comprising:

a ceramic ring of a generally hollow cylindrical shape having a cylindrical inner surface serving as a sliding surface of a radial hydrodynamic bearing and a pair of end surfaces each serving as a sliding surface of a thrust hydrodynamic bearing;

a plastic ring fixedly fitted over said ceramic ring;

a polygon mirror made of aluminum and fixedly fitted over said plastic ring by shrink fitting;

said plastic ring having a thermal expansion coefficient greater than that of said ceramic ring as well as greater than that of said polygon mirror; and said plastic ring having a plurality of voids of the same shape formed therein, the number of said voids being equal to the number of mirror surfaces of said polygon mirror, said voids being arranged at uniform intervals in a circular array concentric with said plastic ring, and said voids comprising through holes or recesses.

2. A polygon mirror rotor as claimed in claim 1, further comprising an upper yoke made of a ferromagnetic material and fixedly fitted over said ceramic ring above said plastic ring and said polygon mirror, a lower yoke supporting a magnet ring and fixedly fitted over said ceramic ring below said plastic ring and said polygon mirror, and said upper and lower yokes being mounted on said ceramic ring without any contact with said plastic ring and/or said polygon mirror.

3. A polygon mirror rotor as claimed in claim 2, wherein said mirror surfaces of said polygon mirror are finally finished after said plastic ring, said polygon mirror, and said upper and lower yokes are mounted on said ceramic ring.

4. A polygon mirror scanner motor comprising a polygon mirror rotor as claimed in claim 3, said polygon mirror scanner motor further comprising:

a radial shaft sleeve rotatably supporting said ceramic ring thereon and constituting said radial hydrodynamic bearing together with said inner surface of said ceramic ring;

a pair of thrust plates fixed to upper and lower ends of said radial shaft sleeve and facing said end surfaces of said ceramic ring and constituting said thrust hydrodynamic bearings together therewith; and a stator coil facing said magnet ring supported by said lower yoke of said polygon mirror motor.

5. A polygon mirror scanner motor comprising a polygon mirror rotor as claimed in claim 2, said polygon mirror scanner motor further-comprising:

a radial shaft sleeve rotatably supporting said ceramic ring thereon and constituting said radial hydrodynamic bearing together with said inner surface of said ceramic ring;

a pair of thrust plates fixed to upper and lower ends of said radial shaft sleeve and facing said end surfaces of said ceramic ring and constituting said thrust hydrodynamic bearing together therewith; and a stator coil facing said magnet ring supported by said lower yoke of said polygon mirror motor.

6. A polygon mirror scanner motor comprising a polygon mirror rotor as claimed in claim 1, said polygon mirror scanner motor further comprising:

a radial shaft sleeve rotatably supporting said ceramic ring thereon and constituting said radial hydrodynamic bearing together with said inner surface of said ceramic ring; and a pair of thrust plates fixed to upper and lower ends of said radial shaft sleeve and facing said end surfaces of said ceramic ring and constituting said thrust hydrodynamic bearing together therewith.

7. A polygon mirror rotor, comprising:

a ceramic ring of a generally hollow cylindrical shape having a cylindrical inner surface serving as a sliding surface of a radial hydrodynamic bearing and a pair of end surfaces each serving as a sliding surface of a thrust hydrodynamic bearing;

a plastic ring fixedly fitted over said ceramic ring;

a polygon mirror made of aluminum and fixedly fitted over said plastic ring by shrink fitting;

said plastic ring having a thermal expansion coefficient greater than that of said ceramic ring as well as greater than that of said polygon mirror;

an upper yoke made of a ferromagnetic material and fixedly fitted over said ceramic ring above said plastic ring and said polygon mirror;

a lower yoke supporting a magnet ring and fixedly fitted over said ceramic ring below said plastic ring and said polygon mirror; and said upper and lower yokes being mounted on said ceramic ring without any contact with said plastic ring and/or said polygon mirror.

8. A polygon mirror scanner motor comprising a polygon mirror rotor as claimed in claim 7, said polygon mirror scanner motor further comprising:

a radial shaft sleeve rotatably supporting said ceramic ring thereon and constituting said radial hydrodynamic bearing together with said inner surface of said ceramic ring;

a pair of thrust plates fixed to upper and lower ends of said radial shaft sleeve and facing said end surfaces of said ceramic ring and constituting said thrust hydrodynamic bearing together therewith; and a stator coil facing said magnet ring supported by said lower yoke of said polygon mirror motor.

9. A polygon mirror rotor as claimed in claim 7, wherein said mirror surfaces of said polygon mirror are finally finished after said plastic ring, said polygon mirror, and said upper and lower yokes are mounted on said ceramic ring.

10. A polygon mirror scanner motor comprising a polygon mirror rotor as claimed in claim 9, said polygon mirror scanner motor further comprising:

a radial shaft sleeve rotatably supporting said ceramic ring thereon and constituting said radial hydrodynamic bearing together with said inner surface of said ceramic ring;

a pair of thrust plates fixed to upper and lower ends of said radial shaft sleeve and facing said end surfaces of said ceramic ring and constituting said thrust hydrodynamic bearing together therewith; and a stator coil facing said magnet ring supported by said lower yoke of said polygon mirror motor.

* * * * *